United States Patent [19]

D'Anna et al.

[11] Patent Number: 5,800,884
[45] Date of Patent: Sep. 1, 1998

[54] HIGH GLOSS ULTRAVIOLET CURABLE COATING FOR POROUS SUBSTRATES

[75] Inventors: Guy D'Anna, Ridgefield, N.J.; Stephen H. Monroe, Germantown, Tenn.; Peter J. Angelini, Central Valley, N.Y.; James A. Goettmann, North East; John R. Boylan, Newtown, both of Pa.

[73] Assignee: International Paper Company, Purchase, N.Y.

[21] Appl. No.: 458,214

[22] Filed: Jun. 2, 1995

Related U.S. Application Data

[60] Division of Ser. No. 124,153, Sep. 20, 1993, Pat. No. 5,492,723, which is a continuation-in-part of Ser. No. 4,881, Jan. 19, 1993, abandoned, and a continuation-in-part of Ser. No. 823,525, Jan. 21, 1992, abandoned, and Ser. No. 916,819, Jul. 20, 1992, Pat. No. 5,403,444, which is a continuation-in-part of Ser. No. 489,427, Mar. 5, 1990, Pat. No. 5,133,835.

[51] Int. Cl.⁶ ............. C08J 7/04; C08F 2/50; B32B 27/02; B32B 27/16
[52] U.S. Cl. ............ 428/35.7; 428/36.1; 428/36.3; 428/196; 428/207; 428/292.1; 428/297.7; 428/297.4; 428/300.4; 427/513; 427/519; 427/511
[58] Field of Search .............. 428/35.7, 36.1, 428/36.3, 225, 227, 245, 252, 293, 196, 207, 292.1, 297.4, 297.7, 300.4; 427/511, 513, 519

[56] References Cited

U.S. PATENT DOCUMENTS

| | | | |
|---|---|---|---|
| 3,674,621 | 7/1972 | Miyamoto et al. | 162/146 |
| 3,844,916 | 10/1974 | Gaske | 204/159.16 |
| 3,924,023 | 12/1975 | Boranian et al. | 428/334 |
| 4,070,262 | 1/1978 | Guarino et al. | 204/159.15 |
| 4,071,425 | 1/1978 | Guarino et al. | 204/159.15 |
| 4,072,592 | 2/1978 | Due et al. | 204/159.15 |
| 4,072,770 | 2/1978 | Ting | 427/54 |
| 4,133,909 | 1/1979 | Spencer | 427/54 |
| 4,227,979 | 10/1980 | Humke et al. | 428/522 |
| 4,311,766 | 1/1982 | Mattor | 428/514 |
| 4,460,647 | 7/1984 | Keith | 428/369 |
| 4,496,583 | 1/1985 | Yamamoto et al. | 428/288 |
| 4,558,082 | 12/1985 | Eckberg | 524/104 |
| 4,894,280 | 1/1990 | Guthrie et al. | 428/224 |
| 4,970,244 | 11/1990 | Komai et al. | 522/46 |
| 4,997,807 | 3/1991 | Mukoyoshi | 428/195 |
| 5,034,429 | 7/1991 | Kaji et al. | 522/12 |
| 5,037,702 | 8/1991 | Pitts et al. | 428/423.7 |
| 5,047,270 | 9/1991 | Mori et al. | 428/35.2 |
| 5,093,306 | 3/1992 | Mukoyoshi et al. | 428/141 |
| 5,162,389 | 11/1992 | Lee et al. | 522/42 |
| 5,374,508 | 12/1994 | Miura et al. | 428/323 |
| 5,436,073 | 7/1995 | Williams et al. | 428/343 |

OTHER PUBLICATIONS

TMPTA Monomer; Uvecryl® 7100, Ebecryl® 3702 Specification Sheets from Radcure Specialties, Inc. 9800 E. Bluegrass Parkway Louisville, Kentucky 40299 (Feb. 1990).
SILWET Surfactant L–7602 Specification Sheet from Union Carbide Chemicals and Plastics Company, Inc., 39 old Ridgebury Road, Danbury, Ct 06817–0001 (Jan. 30, 1990).
Uvitex® OB specification sheet from Ciba–Geigy Corporation, Seven Skyline Drive Hawthorne, N.Y. 10532 (Jan. 5, 1991).

*Primary Examiner*—Susan W. Berman
*Attorney, Agent, or Firm*—Ostrager, Chong & Flaherty

[57] ABSTRACT

A gloss coating composition comprising radiation curable oligomers and monomers, and photosensitizers in a homogeneous mixture having a viscosity in the range of 4500 to 8000 cps; wherein the presence of the photosensitizers causes polymerization of the radiation curable oligomers and monomers when exposed to an ultraviolet light source. The coating composition is applied to at least one surface of a substrate and exposed to an ultraviolet light source resulting in curing of the composition onto the substrate surface without substantial penetration into the substrate surface forming a gloss coated substrate.

44 Claims, 4 Drawing Sheets

203X

322X

HIGH GLOSS ULTRAVIOLET CURABLE COATING FOR POROUS SUBSTRATES

This is a divisional of application Ser. No. 08/124,153 filed on Sep. 20, 1993, now U.S. Pat. No. 5,492,733, which is a continuation-in-part of application Ser. No. 08/004,881, filed on Jan. 19, 1993 now abandoned; and Ser. No. 07/823,525 filed Jan. 21, 1992, now abandoned, and Ser. No. 07/916,819, filed Jul. 20, 1992, now U.S Pat. No. 5,403,444, which is a continuation-in-part of Ser. No. 07/489,427 filed on Mar. 5, 1990, now issued as U.S. Pat. No. 5,133,835.

FIELD OF THE INVENTION

This invention generally relates to a high gloss ultraviolet curable coating composition and method of making the same. More particularly, it concerns gloss coated products comprised of a substrate coated on at least one surface with an ultraviolet curable coating composition including a homogeneous mixture of radiation curable oligomers and monomers and photosensitizers having a viscosity in the range of 4500 to 8000 cps, preferably 4500 to 5500 cps. The ultraviolet curable coating may be used as a primer coat over the substrate surface wherein the coating surface is capable of printing with ultraviolet inks or ultraviolet compatible inks. Alternatively, or in addition to the primer coat, the ultraviolet curable coating is used as a top coat for imparting high gloss, good rub resistance and flexibility to the substrate. The ultraviolet curable coatings are readily recycled.

BACKGROUND OF THE INVENTION

A search of the prior art has shown radiation curable coating compositions on a variety of substrates.

U.S. Pat. Nos. 4,070,262 and 4,071,425 to Guarino et al. and U.S. Pat. No. 4,072,592 to Due et al. all disclose radiation curable coatings including an adduct of an acrylic acid and epoxy resin and a reactive acrylate monomer. Adhesion of the UV cured coating to a substrate surface is improved by replacing a tertiary amine co-sensitizer at least in part with between 0.5 and 6% by weight of dimethylamino-ethyl acrylate. The coated substrates are preferably metal, but include paper, leather and cloth. In general the viscosities of the coatings range from 150 to 1200 cps. The presence of 0.1 to 6% of benzophenone as a photosensitizer in combination with 0 to 6% of a tertiary amine co-sensitizer is included in the compositions.

U.S. Pat. No. 4,072,770 to Ting discloses UV curable compositions comprising polyester-urethane polymers coated on substrates including metal, wood and floor tile. The photosensitizers used to cure the compositions include a combination of 2-chlorothioxanthone and a phenyl ketone (i.e. benzophenone).

U.S. Pat. No. 4,133,909 to Spencer discloses low viscosity radiation curable aqueous coatings including water soluble ethylenically unsaturated monomers. The presence of the monomer reduces the viscosity of the coatings and improves UV curing. Viscosities of the coatings are in the range of 55 to 230 cps. The coatings are aqueous based for spraying onto a substrate surface. Benzophenone in combination with a tertiary amino acrylate is included in the coatings as a UV photosensitizer.

U.S. Pat. No. 4,970,244 to Komai et al. discloses a photopolymerization initiator of compositions comprising epoxy-modified acrylic oligomers and di-, tri- and tetra-acrylates. The photoinitiator is present in the range of 0.01 to 10% by weight and includes a non-toxic benzophenone group containing peroxyester. Compositions are cured by exposure to UV wavelengths less than 420 nm.

U.S. Pat. No. 5,034,429 to Kaji et al. discloses photopolymerizable compositions including a polymerizable compound with a boiling point of 100° C. or higher, a photoinitiator and a benzene derivative for producing a cured film for use in printed circuit boards. The photoinitiator may be a combination of an amine and benzophenone. The curing wavelength is at 250 to 550 nm.

Finally, U.S. Pat. No. 5,162,389 to Lee et al. discloses a composition cured by UV radiation in less than 1 second for coating on optical fibers. The composition includes a silicone component which rapidly cures when exposed to UV radiation. The composition includes monomethylester of hydroquinone (MEHQ) as a viscosity stabilizer. The composition viscosities are in the range of 1–20 Pa's (10 to 200 cps).

The prior art has shown that radiation curable coating compositions having radiation curable oligomers and monomers including acrylated epoxy oligomers and triacrylate monomers and photosensitizers including benzophenone and acrylated amines are known. In particular, the patents to Guarino et al. and Due disclose acrylic acid and epoxy resin oligomers and acrylate monomers. These composition coatings have low viscosities and are limited to coating metallic substrates. Spencer and Kaji disclose use of benzophenone and amines in combination as photosensitizers, but are directed to UV curing of either water soluble ethylenically unsaturated monomers or polymerizable compounds with boiling points over 100° C. Ting and Lee are directed to different polymer composition components and Komai is directed to a specific type of benzophenone initiator. In general, all the compositions of the cited art have low viscosities, below 1200 cps. However, none of these references teach an ultraviolet curable coating composition including a combination of radiation curable oligomers, monomers and photosensitizers in a homogeneous mixture having a viscosity in the range of 4500 to 8000 cps. The present invention is directed to the provision of such an ultraviolet curable coating. It will be appreciated that advantage over known compositions are obtained by providing a highly viscous coating composition which virtually sits on top of a substrate surface, preferably a porous substrate, and when exposed to an ultraviolet light source results in curing of the coating composition onto the substrate surface without substantial penetration into the surface resulting in a gloss coated substrate.

Accordingly, it is a broad object of the invention to provide a radiation curable gloss coating composition and method of making the same.

A more specific object of the invention is to provide a high gloss ultraviolet curable coating composition comprising radiation curable oligomers and monomers and photosensitizers in a homogeneous mixture having a viscosity in the range of 4500 cps to 8000 cps, preferably 4500 to 5500 cps.

Another more specific object of the invention is to provide a highly viscous coating composition which virtually sits on top of a substrate surface, preferably a porous substrate, and when exposed to an ultraviolet light source results in curing of the coating composition onto the substrate surface without substantial penetration into the surface.

Another object of the invention is to provide gloss coated products comprised of a substrate coated on at least one surface with the ultraviolet curable coating composition.

Another specific object of the invention is to provide a radiation curable coating composition used as a primer coat over a substrate surface wherein the coating surface is capable of printing with ultraviolet inks or ultraviolet compatible inks.

Another more specific object of the invention is to provide a radiation curable coating composition used, alternatively, or in addition to a primer coat, as a top coat over a substrate surface for imparting glass characteristics, good rub resistance and flexibility to the substrate.

A further specific object of the invention is to provide an ultraviolet curable coating that is readily recycled with the coated substrate.

SUMMARY OF THE INVENTION

In the present invention, these purposes, as well as others which will be apparent, are achieved generally by providing a gloss coating composition comprising radiation curable oligomers and monomers, and photosensitizers in a homogeneous mixture having a viscosity in the range of 4500 to 8000 cps. The presence of the photosensitizers causes polymerization of the radiation curable oligomers and monomers when exposed to an ultraviolet light source.

The radiation curable oligomers and monomers are selected from the group consisting of acrylates, methacrylates, vinyl ethers, acrylamide and other oligomers and monomers susceptible to polymerization in the presence of the photosensitizers when exposed to a ultraviolet light source. Preferably, the radiation curable oligomers used in the compositions are acrylated epoxy oligomers. The radiation curable monomers are preferably triacrylate monomers. Typically, the ratio of oligomers to monomers present in the compositions range from 6/1 to 1/6. Generally, the amount of the monomer component is related to the final viscosity of the composition which is in the range of 4500 to 8000 cps, preferably 4500 to 5500 cps.

The photosensitizers included in the composition are a combination of phenyl ketones and acrylated amines. Preferably, the photosensitizers are a combination of benzophenone and acrylated amines typically in the ratio of 3/1 to 1/1.

A preferred embodiment of the composition of the invention includes a homogeneous mixture comprising 25.0–55.0 wet wt. % of an acrylated epoxy oligomer; 9.9–20.0 wet wt. % of benzophenone; 6.1–14.8 wet wt. % of a triacrylate monomer and 5.0–20.0 wet wt. % of an acrylated amine. The viscosity of the coating composition is preferably in the range of 4500 to 5500 cps.

The gloss coating compositions may also contain an inhibitor, preferably selected from the group consisting of hydroquinones, for the stability of the coating. Generally, the presence of the inhibitor prohibits or delays polymerization of the oligomer and monomer components during storage thus improving the shelf life of the compositions. In a preferred embodiment the compositions include 0.1–0.2 wet wt. % of hydroquinone mono-methyl ether (HQMME).

Other additional components of the coating compositions may include slip aids, flow aids, inhibitors, silicas, optical brighteners or cure accelerators.

The coating compositions of the invention are applied to at least one surface of a substrate and exposed to an ultraviolet light source resulting in curing of the composition onto the substrate surface without substantial penetration into the substrate surface to form a gloss coated substrate.

The composition coatings of the invention can be applied to a variety of substrates including non-woven, woven, synthetic paper, paper, paperboard, plastic or metal. When applied to a substrate surface the highly viscous coating composition virtually sits on top of the substrate surface. Preferred applications of the coating compositions of the invention include coating porous substrates. A more preferred application of the coating compositions include coating polymeric synthetic nonwoven substrate materials available as Polyweave™ from International Paper Company, Long Meadow Road, Tuxedo, N.Y., 10987. The preferred coated substrates are suitable for use as lint-free writing paper, labels on plastic bottles, release liner, specialty packaging paper or filter paper.

In a particular preferred Polyweave™ embodiment the coating composition is coated on a porous substrate which is a high-opacity cellulose-free synthetic paper comprising a nonwoven web of wet-laid thermoplastic fibers, all or most of the thermoplastic fibers being made of a predetermined polymeric material. This polymeric synthetic paper contains no cellulosic fibers and therefore can be easily recycled without costly procedures for separating polymeric and cellulosic materials and does not leave behind any foreign material to be screened out when the paper is melted.

In another preferred Polyweave™ embodiment the coating composition is coated on a porous substrate which is a synthetic label paper on a polymeric container, i.e a blow-molded polymeric container. The labels need not be removed prior to recycling of the polymeric containers. Such labels are sufficiently elastic to withstand flexing and squeezing of the plastic container without tearing or separating therefrom. Also this nonwoven label substrate is more porous than film labels, which enhances the printability of the label, and is cheaper to manufacture.

In another preferred Polyweave™ embodiment the coating composition is applied to a porous substrate which is a synthetic paper comprising a nonwoven web of fibers, at least one side of which has a pigmented coating, e.g., a pigment-containing latex. The paper is manufactured from commercially available fibers and the components may be combined in water into a homogeneous mixture and then formed into a web employing a wet-lay process. In accordance with this substrate embodiment, the fiber composition of the web is preferably 88–100% polyethylene pulp and 0–12% polyvinyl alcohol binder fibers. In a variation of this embodiment, the web comprises 70–100% polyethylene pulp, 0–12% polyvinyl alcohol binder fibers and 0–30% polypropylene fibers. In addition, polypropylene pulp can be substituted for all or any portion of the polyethylene pulp. In another variation of this substrate embodiment, the fiber composition of the web is 50–90% chopped polyester staple fibers, 10–40% bicomponent polyester/co-polyester core/sheath binder fibers and 0–10% polyvinyl alcohol binder fibers bonded together. Each bicomponent binder fiber comprises a core of polyester surrounded by a co-polyester sheath.

In the preceding Polyweave™ substrate embodiments, the nonwoven web of fibers is made more printable by saturation with a binder material, for example, with a polyvinyl acetate latex or other suitable latex having a glass transition temperature ($T_g$) of 0°–45° C. The latex is preferably compounded to contain pigment such as calcium carbonate, titanium dioxide or both at pigment/binder ratios of 0.5/1 to 8/1, resulting in a synthetic paper having a surface suitable for high-quality printing thereon. However, the use of a latex binder, as opposed to other conventional binders, is not required.

Generally, the composition coatings are applied to a substrate surface by a variety of methods including direct or reverse roll coating, blanket coating, dampner coating, curtain coating lithographic coating, screen coating or gravure coating. After application, the coating composition is cured by exposure to radiation for between about 0.01 to 30 seconds depending on the coating weights applied and ultraviolet light source. In most instances, the coating compositions will be set by short exposure to radiation, less than one second, which is sufficient to set the coating.

Suitable sources of radiation are ultraviolet light or in compositions where there are no photosensitizers present by electron beam radiation. Preferably, an ultraviolet light of a wave length between 2300 to 4000 Angstrom Units is used to cure the coatings.

The coating weights of the composition applied to the substrate are dependent on the substrate surface being coated. In general, a rough substrate surface will have a higher amount of coating material than a smooth substrate surface. In particular, an uncalendered substrate has a higher composition coating weight than an calendered substrate.

The coating compositions can be used a s a primer coat over a substrate surface wherein the coating surface is capable of printing with ultraviolet or ultraviolet compatible inks. Alternatively, or in addition to the primer coat, the coating compositions are used as a top coat over a substrate surface to impart gloss characteristics, good rub resistance and flexibility to the substrate. In addition, the coating compositions are readily recycled along with the coated substrates.

Other objects, features, and advantages of the present invention will become apparent from the following detailed description of the best mode of practicing the invention when considered with reference to the drawings, as follows:

DETAILED DESCRIPTION OF THE PREFERRED EMBODIMENTS

Figure 1:
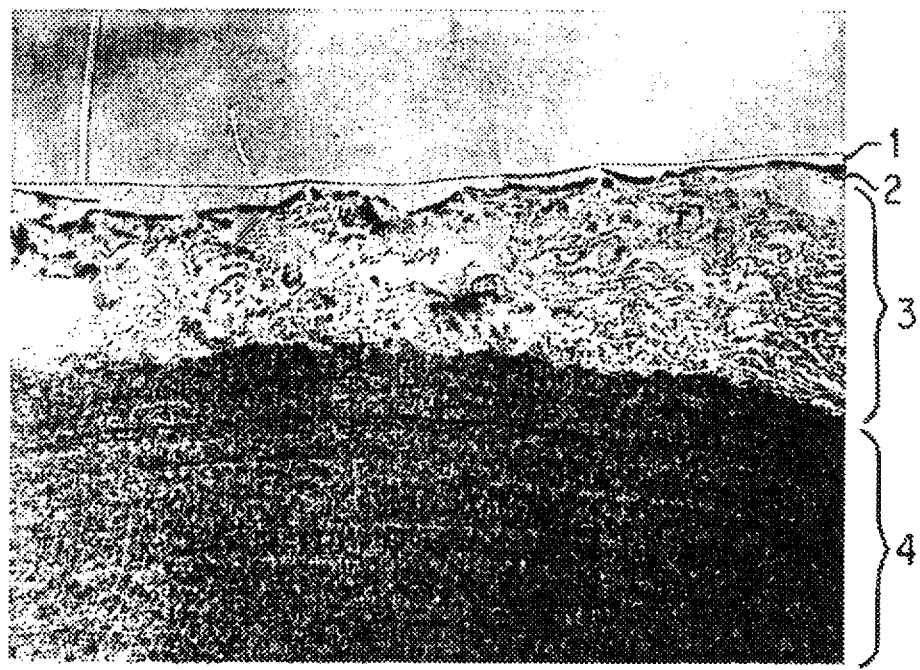
FIGS. 1 and 2 are photomicrographs of the gloss coating composition used as a top coat over an uncalendered Polyweave™ substrate, respectively at 203× and 322×, in accordance with Example I.

In accordance with the invention a gloss coating composition is provided comprising radiation curable oligomers and monomers, and photosensitizers in a homogeneous mixture having a viscosity in the range of 4500 to 8000 cps, preferably 4500 to 5500 cps. The presence of the photosensitizers causes polymerization of the radiation curable oligomers and monomers when exposed to an ultraviolet light source.

The radiation curable oligomers and monomers are selected from the group consisting of acrylates, methacrylates, vinyl ethers, acrylamide and other oligomers and monomers susceptible to polymerization in the presence of the photosensitizers when exposed to a ultraviolet light source. Generally, the radiation curable oligomers and monomers are available commercially or on an experimental basis under various tradenames and from various manufacturers. Preferably, the radiation curable oligomers used in the compositions are acrylated epoxy oligomers. A preferred radiation curable oligomer used in the present composition is Ebecryl®3702 available from Radcure Specialties, Inc., 9800 E. Bluegrass Parkway, Louisville, Ky., 40299. Ebecryl®3702 is a bisphenol A epoxy acrylate oligomer which has been modified with fatty acid. This resin is characterized by its flow and leveling and pigment wetting qualities. Films of Ebecryl®3702 cured by ultraviolet light or electron beam exhibit high gloss, improved water resistance and excellent chemical resistance typical of epoxy resins. The viscosity of Ebecryl®3702 at 65° C. is between 1600 and 2800 cps. Similar oligomers, Ebecryl®3700 and Ebecryl®3701, also available from Radcure Specialties, Inc., may be used in the composition.

The radiation curable monomers are preferably triacrylate monomers. A preferred radiation curable monomer used in the present composition is TMPTA Monomer or trimethylolpropane triacrylate also available from Radcure Specialties, Inc. TMPTA Monomer is a trifunctional monomer which polymerizes when exposed to sources of free radicals. Ultraviolet and electron beam curable formulated products containing TMPTA are characterized by high cross-link density, rapid cure response and excellent hardness. The viscosity of TMPTA at 25° C. is between 50 to 150 cps. TMPTA is a reactive monomer and may undergo spontaneous polymerization if stored improperly. The conditions required for monomer stability include sufficient inhibitor, i.e from the group of hydroquinones, sufficient oxygen, limited storage time, mild storage temperature and no polymerization initiators. Other monomers, including tripropylene glycol diacrylate and 1,6 hexanediol diacrylate may be used in the compositions. However, use of TMPTA is preferred since its presence in the composition provides an increased cure speed of the coating compositions and results in a more flexible coating.

The high viscosity of the composition coatings of the invention are a critical physical characteristic which is related to the amount of monomer present in the compositions. Typically, the ratio of oligomers to monomers present in the compositions range from 6/1 to 1/6. Generally, the amount of the monomer component present is adjusted to obtain the final viscosity of the composition which is in the range of 4500 to 8000 cps, preferably 4500 to 5500 cps.

The coating composition is cured by exposure to radiation. Photosensitizers are included in the composition to render the coatings sensitive to ultraviolet light. If the radiation used to cure the coatings is electron beam a photosensitizer is not needed. However, in the present compositions inclusion of photosensitizers are preferred. Suitable photosensitizers include phenyl ketones and acrylated amines. The presence of both components function to complement each other and are preferably used together in the coating compositions. The presence of a tertiary amine co-sensitizer serves to speed up the cure rate of the ultraviolet curable coatings. A preferred photosensitizer included in the composition comprises a combination of benzophenone and acrylated amines typically in the ratio of 3/1 to 1/1. A preferred acrylated amine used in the compositions is Uvecryl®7100 available from Radcure Specialties, Inc. Uvecryl®7100 is an acrylate functional oligomeric amine resin generally used as an additive or diluent for various oligomers. When used in formulations with a photoabstraction type photoinitiator, e.g. benzophenone, Uvecryl®7100 has an accelerating effect on the ultraviolet cure speed. Uvecryl®7100 also promotes adhesion to plastic substrates such as polyester, acrylonitrile-butadiene-styrene (ABS), polycarbonate and polyphenylene oxide. The viscosity of Uvecryl®7100 at 25° C. is between 500 to 1500 cps.

Alternately, photosensitizers other than a combination of benzophenone and acrylated amines may be used in the invention compositions including a class of IGRACURE® photosensitizers available from Ciba-Geigy Corporation, Seven Skyline Drive, Hawthorne, N.Y., 10532. In particular, preferably between 3 to 5 wt. % of IGRACURE®184, which is 1-hydroxy-cyclohexyl phenyl ketone, can be used in the composition in place of the benzophenone/acrylated amine combination. If IGRACURE® photosensitizers are used in the composition it is not necessary to include an acrylated amine co-sensitizer component. The IGRACURE photosensitizers are preferably used in composition applications utilizing colored inks.

A preferred embodiment of the composition of the invention includes a homogeneous mixture comprising 25.0–55.0 wet wt. % of an acrylated epoxy oligomer; 9.9–20.0 wet wt. % of benzophenone; 6.1–14.8 wet wt. % of a triacrylate monomer and 5.0–20.0 wet wt. % of an acrylated amine. The viscosity of the coating composition is preferably in the range of 4500 to 5500 cps.

The gloss coating compositions may also contain an inhibitor, preferably selected from the group consisting of hydroquinones, for the stability of the coating. Generally, the presence of the inhibitor prohibits or delays polymerization of the oligomer and monomer components during storage thus improving the shelf life of the compositions. In a preferred embodiment the compositions include 0.1–0.2 wet wt. % of hydroquinone mono-methyl ether (HQMME).

Other additional components of the coating compositions may include slip aids, flow aids, inhibitors, silicas, optical brighteners or cure accelerators. Particular additional components include SILWET® Surfactant L-7602 which is an organo-modified polymethylsiloxane available from Union Carbide Chemicals and Plastics Company, Inc., 39 Old Ridgebury Road, Danbury, Conn., 06817-0001. Uvitex®OB, which is 2,2' (2,5thiophenediyl) bis (5-tert-butylbenzoxazole), by Ciba-Geigy Corporation, Seven Skyline Drive, Hawthorne, N.Y., 10532, may be included in the compositions as an optical brightener.

In general the method for making the invention coating compositions includes the steps of blending the radiation curable oligomers and monomers with photosensitizers to form a mixture; heating the mixture with agitation to form a homogeneous mixture having a viscosity in the range of 4500 to 8000 cps, preferably 4500 to 5500 cps; cooling the homogeneous mixture and applying it to at least one surface of a substrate. The coating is cured by exposing the homogeneous mixture to an ultraviolet light source, wherein the presence of the photosensitizers causes polymerization of the radiation curable oligomers and monomers resulting in curing of the mixture onto the substrate surface without substantial penetration into the substrate surface forming a gloss coated substrate.

A preferred process for making the curable composition coating includes first blending 25–55 wet wt. % of an acrylated epoxy oligomer with 9.9–20.0 wet wt. % of benzophenone and then heating to approximately 90°–100° C. with constant agitation to form a mixture. Any additional solid components included in the composition coatings are preferably added during this heating step. The mixture is allowed to cool to approximately 60° C. and 6.1–14.8 wet wt. % of a triacrylate monomer and 5.0–20.0 wet wt. % of an acrylated amine is added to form a homogeneous mixture. Additional components including 0.1–0.2 wet wt. % of an inhibitor may be added. Other components such as slip aids, flow aids, silicas, optical brighteners or cure accelerators may also be included in the composition coatings.

The coating compositions of the invention are applied to at least one surface of a substrate and exposed to an ultraviolet light source resulting in curing of the composition onto the substrate surface without substantial penetration into the substrate surface to form a gloss coated substrate.

The composition coatings of the invention can be applied to a variety of substrates including non-woven, woven, synthetic paper, paper, paperboard, plastic or metal. When applied to a substrate surface the highly viscous coating composition virtually sits on top of the substrate surface. Preferred applications of the coating compositions of the invention include coating porous substrates. Particular preferred substrates, and methods of their manufacture, used in the present invention are disclosed in copending U.S. patent application Ser. Nos. 08/004,881 filed Jan. 19, 1993; 07/823,525 filed Jan. 21, 1992 and 07/916,819 filed Jul. 20, 1992 which is a continuation-in-part of Ser. No. 07/489,427 filed Mar. 5, 1990, now issued as U.S. Pat. No. 5,133,835. The copending application specifications are incorporated herein by reference. A more preferred application of the coating compositions include coating a polymeric synthetic non-woven substrate, (Polyweave™ available from International Paper Company, Long Meadow Road, Tuxedo, N.Y., 10987) as disclosed in copending U.S. patent application Ser. No. 08/004,881, which is suitable for use as lint-free writing paper, labels on plastic bottles, release liner, specialty packaging paper or filter paper. Further illustrations of the preferred substrates used in the present invention are described in the Examples provided herein.

Generally, the composition coatings are applied to a substrate surface by a variety of methods including direct or reverse roll coating, blanket coating, dampner coating, curtain coating, lithographic coating, screen coating or gravure coating. After application, the coating composition is cured by exposure to radiation for between about 0.01 to 30 seconds depending on the coating weights applied and ultraviolet light source. In most instances, the coating compositions will be set by short exposure to radiation, less than one second, which is sufficient to set the coating. Cure speeds of the coatings are generally 100 feet/sec at room temperature.

Suitable sources of radiation are ultraviolet light or in compositions where there are no photosensitizers present by electron beam radiation. Preferably, an ultraviolet light of a wave length between 2300 to 4000 Angstrom Units is used to cure the coatings.

The coating weights of the composition applied to the substrate are dependent on the substrate surface being coated. In general, a rough substrate surface will have a higher amount of coating material than a smooth substrate surface. In particular, an uncalendered substrate has a higher composition coating weight in the range of 0.01 to 0.1 lbs/1000 sq. in., preferably 0.011 to 0.02 lbs/1000 sq. in., than a calendered substrate which has a coating weight in the range of 0.003 to 0.1 lbs/1000 sq. in., preferably 0.003 to 0.02 lbs/1000 sq. in.

The coating compositions can be used as a primer coat over a substrate surface wherein the coating surface is capable of printing with ultraviolet or ultraviolet compatible inks. Alternatively, or in addition to the primer coat, the coating compositions are used as a top coat over a substrate surface to impart gloss characteristics, good rub resistance and flexibility to the substrate. When the coating composition is used as a top coat it is preferable to include silicones as an additional component to increase the desired characteristics on the coated substrate surface. A preferred material used is SILWET® Surfactant L-7602 by Union Carbide which is a polyalkyleneoxide modified polydimethylsiloxane. Silicones are generally not included in the curable coatings for use as a primer coat if printing applications on the coating are desired. In addition, the coating compositions of the invention are readily recycled along with the coated substrates.

The following Examples I to III illustrate the coating composition of the invention on various substrate surfaces. The preferred composition used in the Examples comprise a homogeneous mixture including 25.0–55.0 wet wt. % of an acrylated epoxy oligomer; 9.9–20.0 wet wt. % benzophenone; 6.1–14.8 wet wt. % of a triacrylate monomer; and 5.0–20.0 wet wt. % of an acrylated amine. The coating compositions are applied to the substrate surface and are cured by exposure to ultraviolet wavelengths in the range of 2300 to 4000 Angstrom Units. These Examples are merely representative and are not inclusive of all the possible embodiments of the invention.

EXAMPLE I

The substrate in this Example is comprised of Polyweave™ available from International Paper Company. This particular embodiment of Polyweave™ includes high density polyethylene fibers specifically 87% polyethylene pulp, 7.5% olefinic fibers, 5.5% PVOH fibers and a mill-applied coating of 50% Vinac 884 polyvinyl acetate latex and 50% calcium carbonate.

The coating composition is a homogeneous mixture of 25.0–55.0 wet wt. % of an acrylated epoxy oligomer; 9.9–20.0 wet wt. % benzophenone; 6.1–14.8 wet wt. % of a triacrylate monomer; and 5.0–20.0 wet wt. % of an acrylated amine, having a viscosity in the range of 4500 to 5500 cps.

Figure 2:
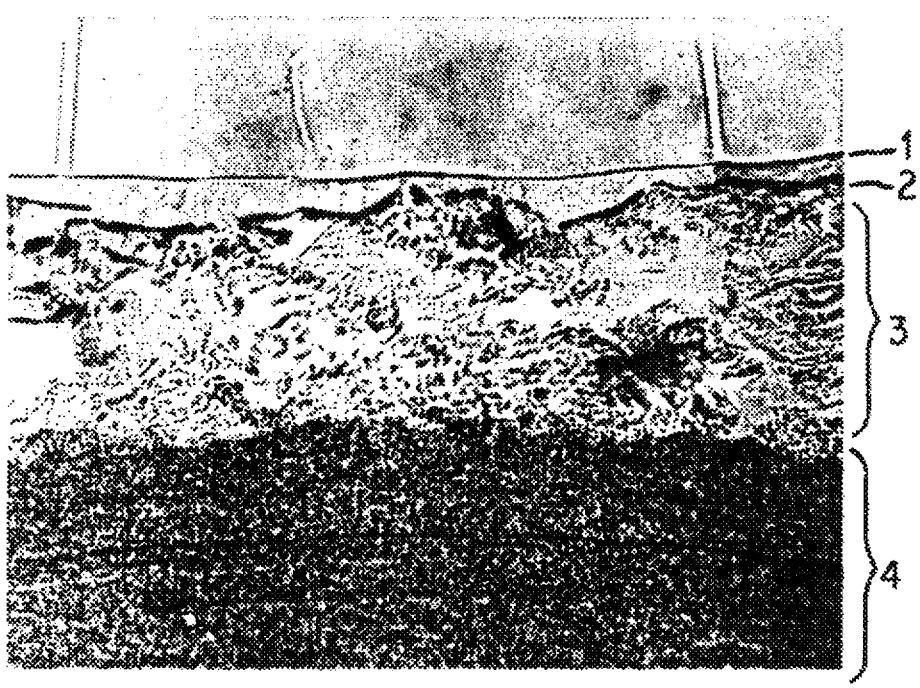

The coating composition is applied as a top coat to the substrate surface, which is an uncalendered, and cured. As shown in FIGS. 1 and 2, which are photomicrographs at 203× and 322× magnifications respectively, the composition forms a top coat 1 over the ink printed 2 uncalendered substrate surface 3. The Polyweave™ substrate in this Example is a label attached to a bottle container 4. The coating weight of the composition is between 0.01 to 0.1 lbs/1000 sq. in. The curable coating of the invention functions to fill in the voids of the relatively rough uncalendered surface to produce a smooth surface. The photomicrographs illustrate that the coating does not penetrate the substrate surface, however, the coating does have strong adhesion to the substrate. Testing has shown that delamination will occur within the substrate but not between the substrate and the ultraviolet coating.

EXAMPLE II

The substrate and coating composition used in this Example is the same as in Example I except that the substrate surface is calendered.

Figure 3:
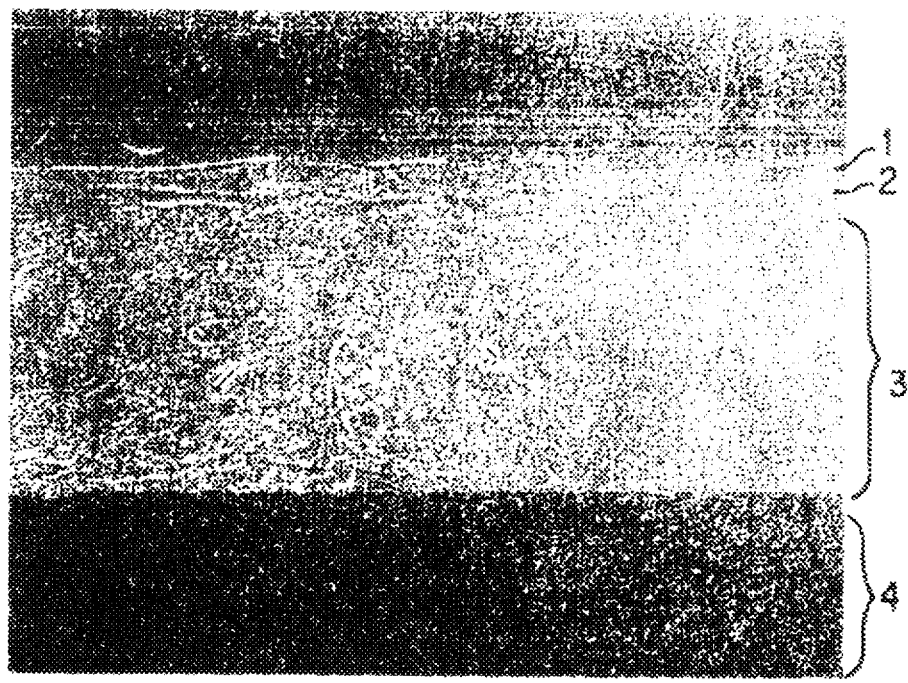
FIGS. 3 and 4 are photomicrographs of the gloss coating composition used as a top coat over a calendered Polyweave™ substrate, respectively at 203× and 322×, in accordance with Example II.
Figure 4:

The coating composition is again applied as a top coat to the substrate surface and cured. As shown in FIGS. 3 and 4, which are photomicrographs at 203× and 322× magnifications respectively, the composition forms a top coat 1 over the ink printed 2 calendered substrate surface 3. The Polyweave™ substrate in this Example is a label attached to a bottle container 4. The coating weight of the composition is between 0.003 to 0.1 lbs/1000 sq. in. FIGS. 3 and 4 illustrate that ink layer 2 appears to be more uniform in the calendered substrate as compared with the uncalendered substrate in FIGS. 1 and 2. The smoother surface of the calendered substrate results in application of lower coating composition weights. Like the uncalendered substrate surface photomicrographs show that the composition coating 1 does not penetrate the substrate surface 3.

EXAMPLE III

The substrates used in this Example are the same as in Example I. Both uncalendered (rough surface) and calendered (smooth surface) Polyweave™ substrate surfaces were coated with the following curable composition coatings as a primer coat and as a top coat.

EXAMPLE III

Primer Coat Composition

| Approximate amounts | |
|---|---|
| 55 wt. % | acrylated epoxy oligomer[1] |
| 14 wt. % | benzphenone |
| 18 wt. % | triacrylate monomer[2] |
| 13 wt. % | acrylated amine[3] |

[1]Ebecryl ®3702 by Radcure Specialties, Inc. which is a bisphenol A epoxy acryLate oligomer which has been modified with fatty acid
[2]TMPTA Monomer by Radcure Specialties, Inc. which is a trimethylolpropane triacrylate
[3]Uvecryl ®7100 by Radcure Specialties, Inc. which is an acrylate functional oligomeric amine resin

EXAMPLE III

Top Coat Composition

| Approximate amounts | |
|---|---|
| 55 wt. % | acrylated epoxy oligomer[1] |
| 14 wt. % | benzphenone |
| 17 wt. % | triacrylate monomer[2] |
| 13 wt. % | acrylated amine[3] |
| 1 wt. % | silicone[4] |
| 0.2 wt. % | optical brightner[5] |

[1]Ebecryl ®3702 by Radcure Specialties, Inc. which is a bisphenol A epoxy acrylate oligomer which has been modified with fatty acid
[2]TMPTA Monomer by Radcure Specialties, Inc. which is a trimethylolpropane triacrylate
[3]Uvecryl ®7100 by Radcure Specialties, Inc. which is an acrylate functional oligomeric amine resin
[4]Silwet ®Surfactant L-7602 which is a organo-modified polymethylsiloxane by Union Carbide
[5]Uvitex ®OB by Ciba-Geigy which is 2,2'(2,5-thiophenediyl)bis(5-tert-butylbenzoxazole)

The primer and top coat compositions both have viscosities in the range of 4500 to 5500 cps. The primer coat composition above was applied to both substrate surfaces using a dampner coating system and cured with ultraviolet light. The coated surface was printed on with ultraviolet inks and ultraviolet compatible inks. A top coat composition including additionally silicone and optical brightner components was applied to the primer-ink coated surfaces using a roll coating system and cured. Not shown in the Examples, the top coat may also be directly applied to a substrate surface that has not been ink printed.

The coating weights of the primer and top coats on the substrates are listed below.

| COATING WEIGHTS-EXAMPLE III (lbs/1000 sq.in.) | | |
|---|---|---|
| CURABLE COATING | UNCALENDERED SUBSTRATE | CALENDERED SUBSTRATE |
| PRIMER COAT | 0.011–0.02 | 0.003–0.02 |
| TOP COAT | 0.003–0.02 | 0.003–0.02 |

As shown by the results above the uncalendered substrate generally has higher coating weights in both primer and top coat applications than a calendered substrate. The coating weights of the compositions in an uncalendered substrate range from 0.01 to 0.1 lbs/1000 sq. in., preferably from 0.011 to 0.02 lbs/1000 sq. in. in primer coat applications and preferably from 0.003 to 0.02 lbs/1000 sq. in. in top coat applications. Whereas, the coating weights of the compositions in a calendered substrate range from 0.003 to 0.1 lbs/1000 sq. in., preferably from 0.003 to 0.02 lbs/1000 sq. in. in both primer coat and top coat applications.

It is noted that even though the coating composition layer may be thin the coatings are applied in amounts sufficient to provide a barrier to protect an ink printed surface and/or amounts sufficient to impart gloss, chemical resistance and related characteristics to the coated substrates.

Examples I to III are directed to particular substrate embodiments, however the invention compositions are not limited to coating these particular embodiments. The composition coating may be applied to non-woven, woven, paper, paperboard, plastic or metal substrate surfaces in the same manner and with the same resulting effects as illustrated in the Examples.

The Polyweave™ substrates used in the preceding Examples are disclosed in co-pending U.S. patent application Ser. No. 08/004,881. In accordance with the prior application synthetic paper is formed from a web of synthetic fibers with no cellulosic fibers. The synthetic fibers may be made of polyethylene, polyester, polypropylene or any other polymeric material suitable for use in high-opacity paper. In a first preferred embodiment, the web comprises 88–100% polyethylene fibers and 0–12% polyvinyl alcohol fibers and is coated with an polyvinyl acetate latex or other suitable latex having a glass transition temperature ($T_g$) of 0°–45° C. and compounded to contain pigment such as calcium carbonate, titanium dioxide, clay, talc or other inorganic pigments as known to those skilled in the art. This coating may contain any conventional binder other than latex.

The synthetic paper is manufactured from commercially available fibers such as polyethylene pulp, polypropylene pulp, chopped polyester staple fibers and polyvinyl alcohol binder fibers. The components may be combined in water into a homogeneous mixture and then formed into a mat employing a wet-lay process.

In accordance with a first example of a polyethylene-based synthetic paper, the starting fiber materials consist of 90 wt. % Mitsui 9400 Fybrel™ polyethylene pulp commercially available in the United States from Minifibers, Route 14, Box 11, Johnson City, Tenn. 37615 and 10 wt. % Kuraray 105-2 polyvinyl alcohol (PVA) binder fibers commercially available in the United States from Itochu Corp., 335 Madison Avenue, New York, N.Y. 10017. In Mitsui 9400 Fybrel™ polyethylene pulp the polyethylene fibers have an average length of 0.90 mm and a diameter of 15 microns. Kuraray 105-2 PVA binder fibers have an average length of 5 mm and a denier of 2.0.

In accordance with a second example of a polyethylene-based synthetic paper, the starting fiber material may be 100 wt. % Mitsui 9400 Fybrel™ polyethylene pulp, that is, PVA binder fibers are not essential to practice of the invention. In this embodiment, the polyethylene pulp is entangled during the wet lay process to form the base sheet. Optionally, the base sheet may thereafter be coated with the pigmented binder—avoiding thermal fusion of the polyethylene pulp—to produce a high-opacity synthetic paper having excellent printability.

Alternatively, in accordance with a variation of the polyethylene-based synthetic paper, some of the Kuraray 105-2 PVA binder fibers are replaced by 10 mm×2.2 denier Hercules Herculon™ polypropylene staple fibers. These polypropylene staple fibers are commercially available in the United States from Hercules, Inc., 3169 Holcomb Bridge Road, Suite 301, Norcross, Ga. 30071. In accordance with this variation the web is comprised of 70–100% polyethylene fibers, 0–12% PVA fibers and 0–30% polypropylene fibers. One example of this variation successfully made by the inventors had 85% polyethylene fibers, 7.5% PVA fibers and 7.5% polypropylene fibers.

In all of the foregoing variations, polypropylene pulp can be substituted for the polyethylene pulp.

After the base mat has been dried, it is preferably treated with a coating comprised of a binder, e.g., a latex, optionally, pigmented with calcium carbonate, titanium dioxide, clay, talc or other inorganic pigment to enhance the printability of the paper. The surface treatment may be applied with any commercially available coater, treater or size press. As used in the specification herein this particular coating is referred to as the mill-applied coating. Thereafter the web can be machine calendared to give the coating a predetermined surface smoothness.

In accordance with the preferred embodiment of the mill-applied coating applied to the above-described webs, the starting coating materials are 50 wt. % Vinac 884 polyvinyl acetate latex and 50 wt. % Albagloss calcium carbonate. Alternatively, Airflex 4514 ethylene vinyl chloride latex can be used in place of the Vinac 884 polyvinyl acetate latex, although the latter is preferred. The Vinac 884 and Airflex 4514 latexes are commercially available in the United States from Air Products and Chemicals, Polymers and Chemicals Division, 7201 Hamilton Blvd., Allentown, Pa. 18195-1501. The Albagloss calcium carbonate is commercially available in the United States from Pfizer, Inc., Minerals, Pigments and Metals Division, 640 North 13th Street, Easton, Pa. 18042-1497. The range of calcium carbonate incorporated in the coating can be varied from a pigment/binder ratio of 0.5/1 to 8/1, although the preferred ratio is 1/1.

Figure 5:
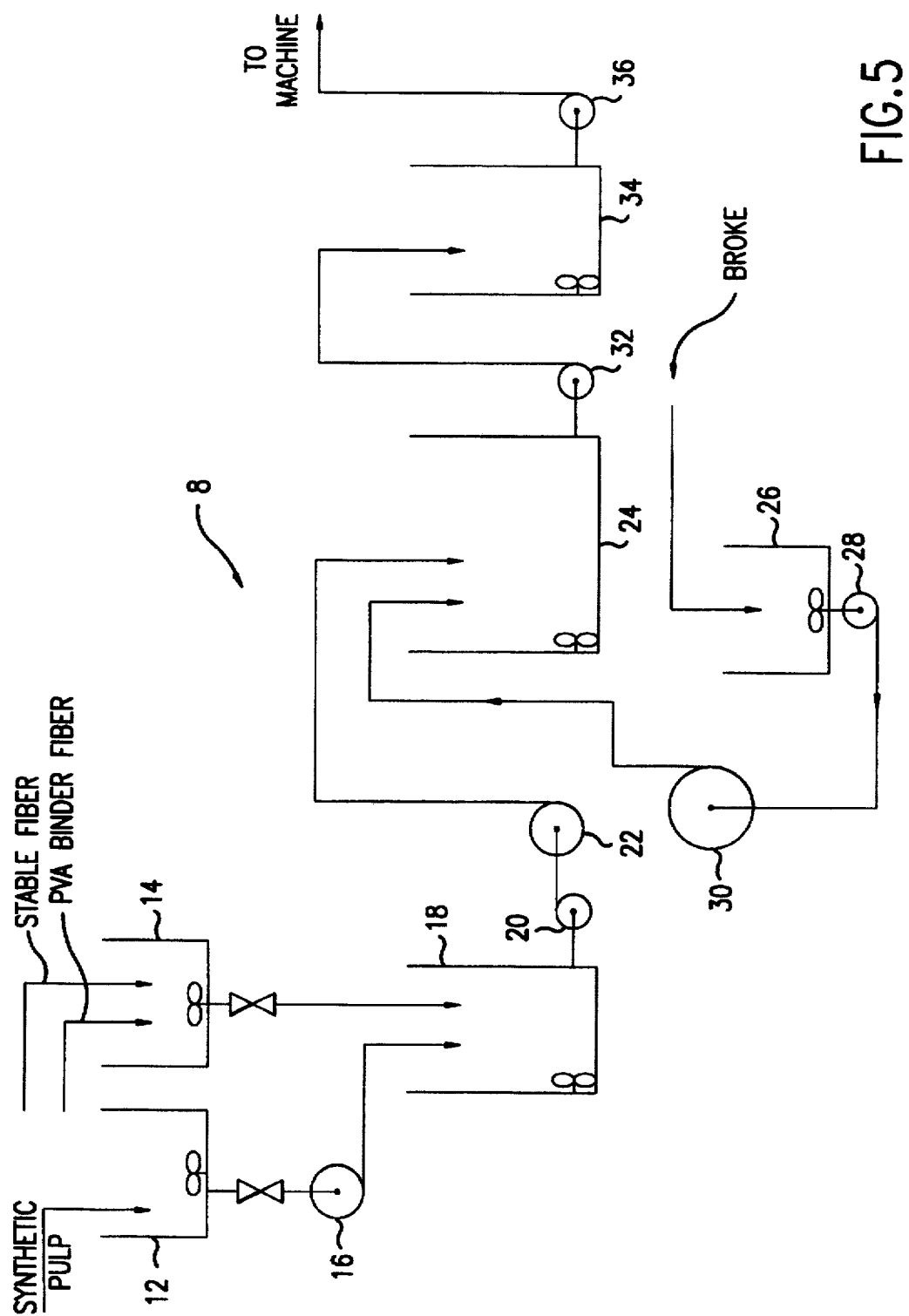
FIG. 5 is a diagram showing the production line for making up the stock for use in manufacturing the synthetic paper (Polyweave™) which is a preferred substrate of the invention.

The synthetic paper used in the invention can be made on standard papermaking equipment. The process for making label paper prepared from a web of polyethylene pulp, PVA binder fibers and polypropylene staple fibers is described hereinafter with reference to FIGS. 5 and 6, which show the stock make-up equipment 8 and the papermaking equipment 10, respectively.

The Fybrel™ 9400 polyethylene pulp is loaded in a fiber opening chest 12 at consistencies between 2% and 5% solids. The pulp is agitated until it is completely dispersed in water and no fiber bundles are apparent. This mixture is then pumped to a blend chest 18 via a deflaker 16. In the deflaker the fibers are subjected to fiber-to-fiber agitation which removes any fiber bundles or unopened clumps. The deflaker is preferable to a disk refiner in that no cutting or shortening of the fibers occurs.

At the same time a predetermined amount of Kuraray 105-2 PVA binder fibers and, optionally, a predetermined amount of polypropylene staple fibers are loaded in a fiber opening chest 14 at consistencies between 0.5% and 5% solids in hot water. The PVA binder fibers become gelatinous in hot water. The dispersion is agitated until the staple fibers are completely dispersed in water and no fiber bundles are apparent. This mixture is then pumped into blend chest 18. Alternatively, no pump is needed if the mixture is dropped by gravity into blend chest 18. The binder and staple fiber dispersion is added to the furnish so that the PVA binder fibers and the staple fibers make up 0–12 wt. % and 0–30 wt. % of the furnish solids, respectively. The mixture is agitated to achieve a uniform dispersion of the polyethylene pulp, staple fibers and gelatinous PVA having a consistency between 1% and 5% solids.

Optionally, the furnish is then pumped by pump 20 to the refiner 22, which beats the fibers as needed to reduce their average length. The refined furnish then enters a surge chest 24, where it is mixed with the broke furnish from broke pulper 26.

Broke is synthetic paper that has been rejected during the process of manufacture. Broke may take the form of either "wet" broke or "dry" broke. Wet broke is synthetic paper taken off the wet press of the paper machine. Dry broke is paper spoiled when passing through the dryers or the calendar, trimmed off in the rewinding of rolls, trimmed from sheet being prepared for shipping or rejected for manufacturing defects.

In accordance with the process of making the synthetic paper, the broke is loaded in the broke pulper 26 at consistencies between 1% and 5% solids. The broke furnish is agitated by high-shear agitator 28 until the broke fibers are completely dispersed in water and no fiber bundles are apparent. The broke furnish is then pumped to surge chest 24 via a deflaker 30 in a controlled manner to maintain consistency and limit the percent of broke addition to not exceed 20% of the total volume. The refined furnish and the broke furnish are mixed in surge chest 24 until a uniform dispersion is achieved.

The furnish in surge chest 24 is then pumped via pump 32 into machine chest 34, which feeds its contents into the forming section while maintaining a constant level in the chest to reduce variation in product weight. The final stock is pumped to the papermaking machine (see FIG. 5) by pump 36.

Before the stock is made into synthetic paper, large contaminants (such as dirt, gravel, pieces of kraft bags, sand and grit) and fiber bundles are removed from the stock by screening in primary and secondary cleaners 38 and 40. Material containing rejected debris is fed to the secondary cleaners from the primary stage. Rejects from the secondary stage are sewered while accepts are sent back to the main feed stream. This is a way to concentrate the rejects and save fiber.

The furnish is supplied to the headbox 42 at consistencies between 0.1% and 1% solids. A web of synthetic fibers is then formed on standard wet-lay papermaking equipment by forming wire 44. Excess water is removed by gravity and vacuum devices. The formed web is wet-pressed in press section 46 and then dried in the first dryer section 48 at a temperature in the range of 140° F. to 260° F. to remove more water.

During drying, the polymeric fibers are not fused, but rather the gelatinous PVA becomes a glue which pre-bonds the polyethylene pulp and staple fibers into a web. (For applications where high strength is not a requirement, PVA is unnecessary. For example, 100% polyethylene pulp entangled by the wet-lay process has adequate strength to be fed to the saturator/coater.) When drying the web, care must be taken to ensure that the web and dryer can temperatures remain below the melting point of the polyethylene fibers, that is, below 269° F. (132° C.). Otherwise the opacity of the synthetic paper will be degraded. The use of release coating on the dryer cans was found to be beneficial in preventing buildup or sticking that will eventually cause web defects and/or breaks.

Thereafter the dried web is saturated with polyvinyl acetate latex solution containing calcium carbonate pigment. This treatment may be performed on a paper machine size press or any type of off-line coater or treater 50 which is supplied with saturant from mixing chest 52. The coating is applied to the web in an amount that achieves a 10 wt. % add-on of dried coating solids, that is, 200 lbs/ton, although it will be recognized by the person skilled in the art that the weight percentage of dried coating solids can be varied over a wide range. The coating is then dried in the second dryer section 54, again at a temperature in the range of 140° F. to 260° F., whereby the polyvinyl acetate bonds the fibers to each other and bonds the pigment to the fibers. Excessive heat is to be avoided during saturation because the latex coagulates when exposed to excessive heat, leading to latex buildup on the rolls. After the coating is dried, the coated web is machine calendared in calendar 56 to attain a surface smoothness (Sheffield) of 125–250 units and is then wound on winding reel 58.

The physical properties of synthetic paper made from 90% polyethylene pulp and 10% PVA binder fibers in accordance with the invention are listed in Table I.

In accordance with another preferred embodiment of the synthetic paper, the web comprises chopped polyester staple fibers, bicomponent polyester/co-polyester core/sheath binder fibers and PVA binders fibers. Each bicomponent binder fiber comprises a core of polyester surrounded by a co-polyester sheath. After the wet-laid sheet has been dried, the dried base sheet is thermal-bonded at a predetermined temperature and a predetermined pressure to bond

TABLE I

| | Physical Property Test Data | | |
|---|---|---|---|
| TAPPI No. | Physical Property | Uncoated Base Sheet | Finished Coated Sheet |
| 410 | Basis Weight (3300 ft$^2$) (oz./yd$^2$) | 45.0 2.2 | 50.0 2.4 |
| 411 | Caliper (mils) | 8.8 | 8.0 |
| 251 | Porosity-Permeability Frazier Air (cfm) | <0 | <0 |
| 460 | Gurley Porosity (sec/100 cc) | 10 | 22 |
| 538 | Sheffield Smoothness (T/W) | — | 200/260 |
| 403 | Mullen Burst (psi) | — | 5 |
| 414 | Elmendorf Tear (g) (MD/CD) | — | 25/31 |
| 511 | MIT Fold (MD/CD) | — | 2/0 |
| 494 | Tensile (lbs/in.) (MD/CD) | 4.1/2.4 | 5.6/2.8 |
| 494 | Elongation (%) (MD/CD) | — | 4.3/6.5 |
| 494 | TEA (ft-lb/ft$^2$) (MD/CD) | — | 2.1/1.6 |
| 452 | GE Brightness (%) | 93.3 | 93.9 |
| 425 | Opacity (%) | 97.1 | 96.6 |
| 413 | Ash (%) (500° C.) | 0.0 | 3.0 | the fibers on both surfaces of the sheet and impart strength. The sheet is then coated with a polyvinyl acetate latex having a glass transition temperature ($T_g$) of 0°–45° C. Again the latex may be compounded to contain pigment such as calcium carbonate, titanium dioxide, clay, talc or other inorganic pigments at pigment/binder ratios of 0.5/1 to 8./1. Because synthetic paper in accordance with these embodiments has no cellulosic fibers, the synthetic paper may be recycled without going through a separation process.

In accordance with a first example of the polyester-based synthetic paper, the starting fiber materials are 77 wt. % Kuraray polyester chopped strand, 19 wt. % Kuraray N-720 polyester/co-polyester core/sheath binder fibers and 4 wt. % Kuraray 105-2 PVA binder fibers. All of these fibers are commercially available in the United States from Itochu Corp., 335 Madison Avenue, New York, N.Y. 10017. The Kuraray chopped polyester staple fibers have an average length of 10 mm and a denier of 0.4. Kuraray N-720 polyester/co-polyester core/sheath binder fibers have an average length of 10 mm and a denier of 2.0. Kuraray 105-2 PVA binder fibers have an average length of 5 mm and a denier of 2.0.

In accordance with a second example of the polyester-based synthetic paper, the starting fiber materials are 80 wt. % Kuraray polyester chopped strand and 20 wt. % Kuraray N-720 polyester/co-polyester core/sheath binder fibers. No Kuraray 105-2 PVA binder fibers are used.

Alternatively, an equal weight percent of Teijin polyester staple fibers having an average length of 5 mm and a denier of 0.5 can be substituted for the Kuraray chopped polyester staple fibers in the polyester-based synthetic paper. In accordance with other variations, an equal weight percent of polyethylene pulp can be substituted for the PVA binder fibers.

In accordance with yet another variation, the polyester chopped staple fibers can be combined with either PVA binder fibers or polyester/co-polyester core/sheath binder fibers or with both, but only in an amount sufficient to hold the web together as it is fed to a thermal calendar. The thermal calendar then fuses the polyester chopped staple fibers using rolls heated to temperatures of 360°–410° F. (preferably 390° F.) and nip pressures of 800 pli to 1500 pli. The resulting base sheet may be optionally coated with pigmented binder as disclosed above.

The fiber composition of the polyester-based synthetic paper is not limited to the specific weight percentages of the examples described above. The amount of PVA binder fibers may be varied from 0 to 10 wt. %; the amount of co-polyester/polyester sheath/core binder fibers may be varied from 0 to 40 wt. %; and the amount of polyester staple fibers may be varied from 50 to 90 wt. %. Furthermore, the average length and the denier of the chopped polyester staple fibers may vary from 5 to 12 mm and from 0.4 to 1.5 denier respectively; and the average length and the denier of the co-polyester/polyester sheath/core binder fibers may vary from 5 to 12 mm and from 2.0 to 6.0 denier respectively.

In accordance with the mill-applied coated versions of the second preferred embodiment, the starting coating materials are 50 wt. % Vinac 884 polyvinyl acetate latex and 50 wt. % Albagloss calcium carbonate. Alternatively, Airflex 4514 ethylene vinyl chloride latex can be used in place of the Vinac 884 polyvinyl acetate latex, although the latter is preferred. The range of calcium carbonate incorporated in the coating can be varied from a pigment/binder ratio of 0.5/1 to 8/1, although the preferred ratio is 1/1. The glass transition temperature $T_g$ of the polyvinyl acetate latex may vary from 0° C. to 45° C.

The web material in accordance with the second preferred embodiment can be made on standard papermaking or nonwoven fabric equipment. The polyester cut staple fibers, the polyester/co-polyester core/sheath binder fibers and the polyvinyl alcohol binder fibers are added to water undergoing agitation and containing a predissolved surfactant material, such as Milease T, at a level of 0.5% based on polyester fiber weight. Milease T is commercially available from I.C.I. Americas, Inc.

The foregoing fiber components should be added to the blend chest in the following sequence: (1) polyvinyl alcohol binder fibers, (2) polyester/co-polyester core/sheath binder fibers and (3) chopped polyester staple fibers. The consistency of the mixture in the blend chest should be between 0.5 and 2.5% solids. An anionic polyacrylamide such as 87P061 may be added at levels in the range 0.5–8.0 lbs/ton based on fiber weight to aid in fiber dispersion. 87P061 is commercially available from Nalco Chemical. The mixture is then agitated to attain a uniform dispersion of all materials. The refining step and broke recovery can be bypassed for the second preferred embodiment.

The resulting furnish is then formed on standard wet-lay papermaking equipment at headbox consistencies of 0.7–0.01%. The wet-laid material is then dried in the dryer section.

The dried web is calendared between smooth metal rolls heated to a temperature of 196° C. The web is calendared at minimal pressure, that is, 50–150 PLI, to achieve bonding of the surface fibers while maintaining the degree of opacity of the original sheet.

This material is then ready to be treated with the polyvinyl acetate latex solution pigmented with calcium carbonate. As noted above, the treatment may be applied on a paper machine size press or any type of off-line coater or saturator. The mill-applied coating is applied in a manner that results in a 10 wt. % add-on of dried coating solids, that is, 200 lbs/ton. The mill-applied coating is then dried. After the coating is dried, the coated web is supercalendared to attain a surface smoothness (Sheffield) of 125–250 units.

The physical properties of the label paper in accordance with the first example of the second preferred embodiment of the synthetic paper are listed in Table II.

TABLE II

| | Physical Property Test Data | | |
|---|---|---|---|
| TAPPI No. | Physical Property | Uncoated Base Sheet | Thermally Bonded Sheet | Finished Coated Sheet |
| 410 | Basis weight (3300 ft$^2$) | 45.0 | 45.0 | 51.3 |
| 411 | Caliper (mils) | 15.6 | 4.8 | 7.9 |
| 251 | Porosity-Permeability Frazier Air (cfm) | 192 | 13 | 38 |
| 451 | Taber V-5 Stiffness (gcm) (MD/CD) | 1.9/1.4 | 1.1/0.9 | 4.2/2.5 |
| 403 | Mullen Burst (psi) | 13 | 126 | 183 |
| 414 | Elmendorf Tear (g) (MD/CD) | 233/261 | 229/168 | 184/138 |
| 511 | MIT Fold (MD/CD) | 3/6 | 2500+/2500+ | 2500+/2500+ |
| 494 | Tensile (lbs/in.) (MD/CD) | 4.7/4.6 | 25.0/25.0 | 33.2/43.2 |
| 494 | Elongation (%) (MD/CD) | 1.4/2.2 | 11.2/10.7 | 12.3/15.8 |
| 494 | TEA (ft-lb/ft$^2$) (MD/CD) | 0.7/1.3 | 32.9/32.1 | 40.4/72.9 |
| 452 | GE Brightness (%) | 82.5 | 86.9 | 85.6 |
| 425 | Opacity (%) | 69.0 | 74.2 | 76.5 |

Tests were conducted to determine the effect of PVA binder level on the strength of the synthetic paper made from polyethylene pulp. The results of those tests are shown in Table III. The results show that the tear and tensile strengths of the synthetic paper are better at a 7.5 wt. % PVA binder fiber level than at 4 or 11 wt. %.

TABLE III

Effect of Polyvinyl Alcohol Level

| Physical Property | PVA Level | | |
|---|---|---|---|
| | 4% | 7.5% | 11% |
| Basis Weight (GMS/m$^2$) | 77 | 78 | 72 |
| Caliper (mils) | 7.6 | 7.8 | 7.7 |
| Gurley Porosity (sec/100 cc) | 24 | 19 | 16 |
| Mullen Burst (psi) | 10 | 11 | 6 |
| Elmendorf Tear (g) (MD/CD) | 39/51 | 45/51 | 37/45 |
| MIT Fold (MD/CD) | 16/3 | 23/10 | 11/4 |
| Tensile (lbs/in.) (MD/CD) | 5.3/3.8 | 6.3/4.1 | 5.3/3.1 |
| GE Brightness (%) | 95.2 | 95.0 | 94.3 |
| Opacity (%) | 93.9 | 93.5 | 91.9 |

Table IV shows the effect of adding a 10-mm-long polypropylene staple fiber to the furnish. The three samples tested had the following compositions: (A) 90% Mitsui 9400 polyethylene pulp, 10% PVA binder fiber and 0% staple fiber; (B) 90% Mitsui 9400 polyethylene pulp, 0% PVA binder fiber and 10% staple fiber; and (C) 85% Mitsui 9400 polyethylene pulp, 7.5% PVA binder fiber and 7.5% staple fiber. Tear strength is improved as the result of adding staple fiber and the improvement is maximized when a binder fiber is included. Porosity increases as the level of higher-diameter fiber (the binder fiber and the staple fiber) increases. This is one way in which sheet porosity can be controlled when designing synthetic papers for applications where either minimal porosity or a specific level of porosity is required.

TABLE IV

Effect of Staple Fiber Addition

| Physical Property | Sample | | |
|---|---|---|---|
| | A | B | C |
| Basis Weight (GMS/m$^2$) | 67 | 85 | 67 |
| Caliper (mils) | 9 | 11 | 9 |
| Porosity (sec/100 cc) | 18 | 12 | 13 |
| Tear Strength (g) (MD/CD) | 26/30 | 39/39 | 51/55 |

Table V shows the effect of coating or size press applications of a binder. The main effect being designed to is the surface strength so that the web can be printed on without the surface being damaged from the tacky ink on the printing plate. The IGT number shows the improvement when a coating is applied. (IGT is a standard laboratory printing test wherein if the material is weak in the direction perpendicular to the sheet, it will pull apart or large sections of the surface will be pulled out.) A carefully formulated coating can also decrease porosity. Stiffness can be increased or left unchanged by careful selection of the binder.

Thus, the porosity of the synthetic paper can be controlled by carefully adjusting the mill-applied coating formulation and by adjusting the amount of staple fibers.

TABLE V

Effect of Coating

| Physical Property | Uncoated Base Sheet | Finished Coated Sheet |
|---|---|---|
| Basis Weight (GSM) | 60 | 80 |
| Caliper (mils) | 6 | 7 |
| Mullen Burst (psi) | 4 | 9 |
| Tensile (lbs/in.) (MD/CD) | 3.5/2.5 | 6/5 |
| Gurley Porosity (sec/100 cc) | 13 | 22 |
| Brightness (%) | 95 | 95 |
| Opacity (%) | 93 | 93 |
| IGT | 0 | 115 |
| Elongation (%) | 6/8 | 13/15 |
| Gurley Stiffness (mgf) (MD/CD) | 28/20 | 35/35 |

The synthetic paper can be used in labeling of blow-molded molded plastic containers. In particular, the label may be applied either in-mold or post-mold to a blow-molded container made of the same synthetic material as the main synthetic fiber component (for example, polyethylene, polyester or polypropylene) of the label with or without the use of an adhesive material and may be recycled along with the container.

Figure 6:
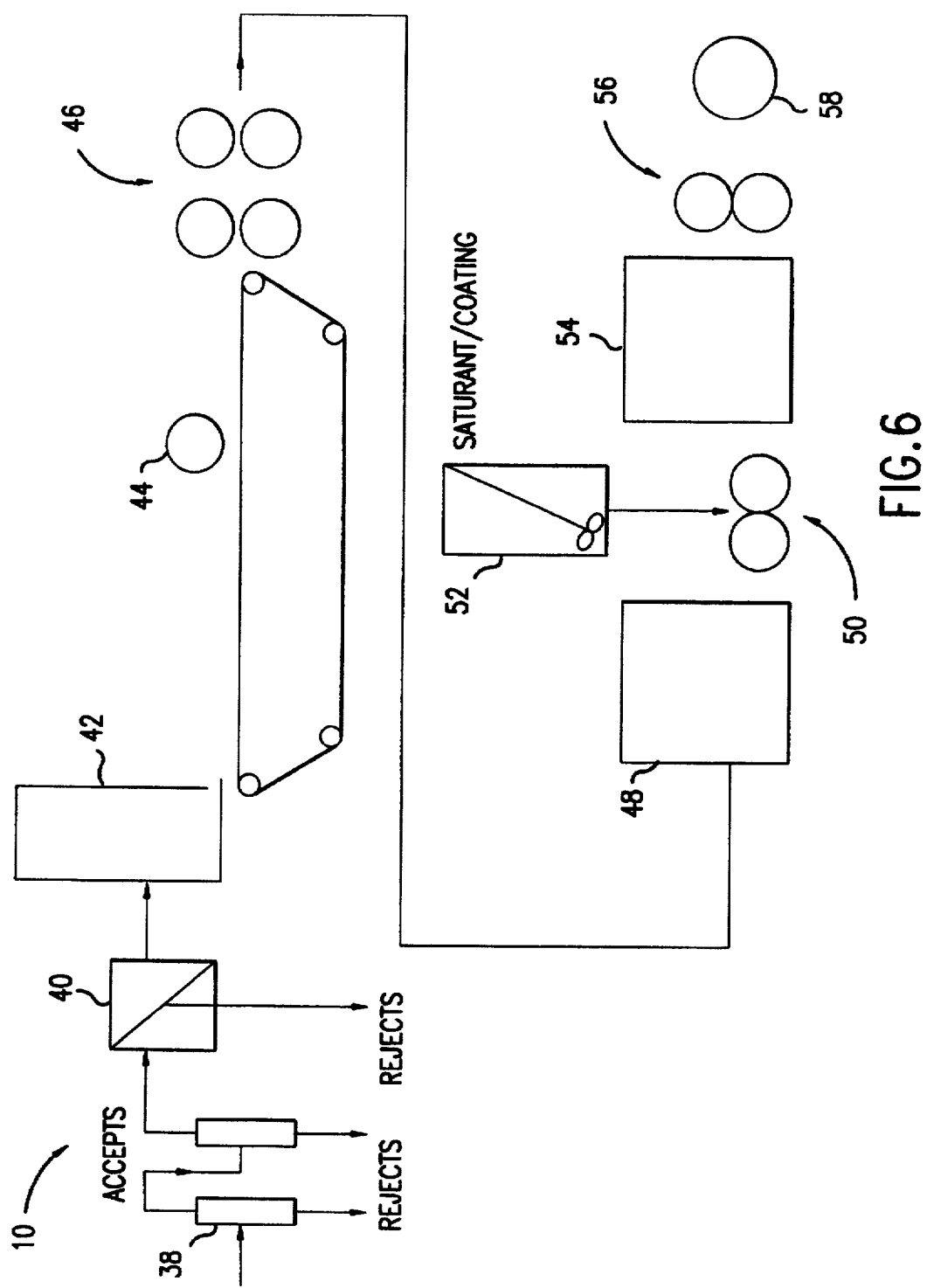
FIG. 6 is a diagram showing the production line for making synthetic paper (Polyweave™) from the stock make-up output by the apparatus of FIG.5.

In accordance with conventional in-mold labeling of blow-molded plastic containers, labels are sequentially supplied from a magazine and positioned inside the mold by, for example, a vacuum-operated device. Plastic material is then extruded from a die to form a parison as depicted in FIG. 6 of U.S. Pat. No. 4,986,866 to Ohba et al., the description of which is specifically incorporated by reference herein. The mold is locked to seal the parison and then compressed air is fed from a nozzle to the inside of the parison to perform blow molding wherein the parison is expanded to conform to the inner surface of the mold. Simultaneously with the blow molding, the heat-sealable layer of the label of Ohba et al. is pressed by the outer side of the parison and fused thereto. Finally, the mold is cooled to solidify the molded container and opened to obtain a labeled hollow container.

A disadvantage of conventional in-mold labels prepared from paper is that prior to recycling of the plastic container, the paper label must be removed using either solvent or mechanical means to avoid contamination of the recycled plastic material by small pieces of paper.

Although the synthetic paper has been described with reference to certain preferred embodiments, it will be appreciated that it would be obvious to one of ordinary skill in the art of fiber technology and papermaking that other polymeric fibers could be used to achieve the same beneficial results. In particular, fibers other than polyethylene pulp and polyester chopped staple fibers can be used as the main fiber component. For example, polyester pulp could be used in place of polyester chopped staple fibers in the event that polyester pulp becomes commercially available. Further, suitable polymeric fibers having a melting point lower than that of the main fiber component can be substituted for PVA binder fibers. For example, polyethylene pulp could be used in place of PVA binder fibers in the polyester-based synthetic paper. Nor are the embodiments of the synthetic paper limited to the use of a specific mill-applied coating binder: suitable coating binders other than polyvinyl acetate latex and ethylene vinyl chloride latex can be used.

It will be recognized by those skilled in the art that the curable coatings of the invention have wide application in coating a variety of substrate surfaces to impart high gloss, good rub resistance and flexibility to the substrate. Advantage over prior art ultraviolet coating compositions is obtained by providing a highly viscous coating composition which virtually sits on top of a substrate surface and when exposed to an ultraviolet light source results in curing of the coating composition onto the substrate surface without substantial penetration into the surface resulting in a gloss coated substrate. The ultraviolet coating also provides good chemical resistance characteristics to the coated substrates whereby chemical contact with the coatings does not dissolve or alter the cured composition coatings. The invention compositions provide further advantage over prior art compositions by providing a coating composition capable of efficiently coating porous substrates and imparting gloss characteristics.

Numerous modifications are possible in light of the above disclosure such as application of alternative radiation curable oligomers and monomers and photosensitizers chosen according to the substrate surface being coated. In addition, curable coating compositions not containing a photosensitizer component can be used which are cured by electron beam rather than ultraviolet radiation. Other modifications including variations of the coating weights in both primer and top coat applications of the compositions are possible.

Also it would be obvious to one of ordinary skill that the preferred embodiments could be readily modified to meet specific conditions not disclosed here. All such variations and modifications are intended to be within the scope and spirit of the invention as defined in the claims appended hereto.

We claim:

1. A gloss coated product comprising a substrate and a gloss coating applied on a surface thereof;

wherein said gloss coating is prepared from a homogeneous mixture of radiation curable oligomers and monomers and photosensitizers having a viscosity in the range of 4500 to 8000 cps; wherein said radiation curable oligomers are acrylated epoxy oligomers, said monomers are triacrylate monomers and said photosensitizer consists essentially of a combination of benzophenone and an acrylated amine in the ratio of 3/1 to 1/1;

wherein said substrate is a high-opacity cellulose-free synthetic paper comprising a nonwoven web of wet-laid thermoplastic fibers, all or most of said thermoplastic fibers being made of a predetermined polymeric material, said web having a continuous coating of pigmented binder formed on at least one surface thereof, said thermoplastic fibers made of said predetermined polymeric material being bonded by said pigmented binder without substantial thermal fusion by curing said binder at temperatures below the melting temperature of said predetermined polymeric material; and the presence of said photosensitizers causes polymerization of said radiation curable oligomers and monomers when exposed to an ultraviolet light source resulting in curing of said mixture onto the substrate surface without substantial penetration into the substrate surface forming the gloss coated product.

2. The gloss coated product according to claim 1, wherein said homogeneous mixture further comprises an inhibitor for the stability of said mixture.

3. The gloss coated product according to claim 2, wherein said inhibitor is selected from the group consisting of hydroquinones.

4. A gloss coated product according to claim 1, wherein said homogeneous mixture comprises:

25.0–55.0 wet wt. % acrylated epoxy oligomer
9.9–20.0 wet wt. % benzophenone
6.1–14.8 wet wt. % triacrylate monomer
5.0–20.0 wet wt. % acrylated amine.

5. The gloss coated product according to claim 4, wherein said homogeneous mixture further comprises 0.1–0.2 wet wt. % of hydroquinone mono-methyl ether.

6. The gloss coated product according to claim 1, wherein said homogeneous mixture further consists of slip aids, flow aids, inhibitors, silicas, optical brighteners or cure accelerators.

7. A gloss coated product according to claim 1, wherein said gloss coated product surface is a printable surface.

8. A gloss coated product according to claim 1, wherein a second gloss coating is applied over said gloss coated product surface.

9. A gloss coated product according to claim 1, wherein said predetermined polymeric material is a polyolefin.

10. A gloss coated product according to claim 9, wherein said polyolefin is polyethylene or polypropylene.

11. A gloss coated product according to claim 1, wherein said fibers made of said predetermined polymeric material are polyethylene or polypropylene pulp.

12. A gloss coated product according to claim 1, wherein said nonwoven web is 88–100% olefinic pulp and 0–12% polyvinyl alcohol binder fibers.

13. A gloss coated product according to claim 12, wherein said binder comprises polyvinyl acetate.

14. A gloss coated product according to claim 13, wherein the ratio of pigment to binder lies in the range from 0.5/1 to 8/1.

15. A gloss coated product according to claim 1, wherein said nonwoven web is 70–100% olefinic pulp, 0–12% polyvinyl alcohol binder fibers and 0–30% olefinic staple fibers.

16. A gloss coated product according to claim 15, wherein said olefinic staple fibers comprise polyethylene or polypropylene staple fibers.

17. A gloss coated product comprising a substrate and a gloss coating applied on a surface thereof;

wherein said gloss coating is prepared from a homogeneous mixture of radiation curable oligomers and monomers and photosensitizers having a viscosity in the range of 4500 to 8000 cps; wherein said radiation curable oligomers are acrylated epoxy oligomers, said monomers are triacrylate monomers and said photosensitizer consists essentially of a combination of benzophenone and an acrylated amine in the ratio of 3/1 to 1/1;

wherein said substrate is a synthetic paper comprising a blow-molded container made of a predetermined polymeric material and having an outer surface and a label attached to said outer surface of said blow-molded container, the improvement wherein said label is a synthetic paper, comprising a nonwoven web of wet-laid thermoplastic fibers, all or most of said thermoplastic fibers being made of a predetermined polymeric material, said web having a continuous coating of pigmented binder formed on at least one surface thereof, said thermoplastic fibers made of said predetermined polymeric material being bonded by said pigmented binder without substantial thermal fusion by curing said binder at temperatures below the melting temperature of said predetermined polymeric material, said synthetic paper being bonded to said outer surface of said blow-molded container, at least some of said fibers making up said synthetic paper being made of said predetermined polymeric material; and the presence of said photosensitizers causes polymerization of said radiation curable oligomers and monomers when exposed to an ultraviolet light source resulting in curing of said mixture onto the substrate surface without substantial penetration into the substrate surface forming the gloss coated product.

18. A gloss coated product according to claim 17, wherein said homogeneous mixture comprises:

25.0–55.0 wet wt. % acrylated epoxy oligomer
9.9–20.0 wet wt. % benzophenone
6.1–14.8 wet wt. % triacrylate monomer
5.0–20.0 wet wt. % acrylated amine.

19. A gloss coated product comprising a substrate and a gloss coating applied on a surface thereof;

wherein said gloss coating is prepared from a homogeneous mixture of radiation curable oligomers and monomers and photosensitizers having a viscosity in the range of 4500 to 8000 cps; wherein said radiation curable oligomers are acrylated epoxy oligomers, said monomers are triacrylate monomers and said photosensitizer consists essentially of a combination of benzophenone and an acrylated amine in the ratio of 3/1 to 1/1;

wherein said substrate is a cellulose-free synthetic paper comprising a nonwoven web of 100% thermoplastic fibers entangled by a wet-lay process, said thermoplastic fibers comprising substantially unfused pulp made of a predetermined polymeric material; and the presence of said photosensitizers causes polymerization of said radiation curable oligomers and monomers when exposed to an ultraviolet light source resulting in curing of said mixture onto the substrate surface without substantial penetration into the substrate surface forming the gloss coated product.

20. A gloss coated product according to claim 19, wherein said homogeneous mixture comprises:

25.0–55.0 wet wt. % acrylated epoxy oligomer
9.9–20.0 wet wt. % benzophenone
6.1–14.8 wet wt. % triacrylate monomer
5.0–20.0 wet wt. % acrylated amine.

21. A gloss coated product according to claim 19, wherein said predetermined polymeric material is polyethylene or polypropylene.

22. A gloss coated product according to claim 19, wherein said nonwoven web includes only olefinic pulp.

23. A gloss coated product comprising a substrate and a gloss coating applied on a surface thereof;

wherein said gloss coating is prepared from a homogeneous mixture of radiation curable oligomers and monomers and photosensitizers having a viscosity in the range of 4500 to 8000 cps; wherein said radiation curable oligomers are acrylated epoxy oligomers, said monomers are triacrylate monomers and said photosensitizer consists essentially of a combination of benzophenone and an acrylated amine in the ratio of 3/1 to 1/1;

wherein said substrate is a cellulose-free synthetic paper comprising a nonwoven web of 100% thermoplastic fibers entangled by a wet-lay process, said web having the following fiber composition:

50–90% chopped polyester staple fibers;
0–40% binder fibers containing a thermoplastic material having a melting temperature less than the melting temperature of said chopped polyester staple fibers; and
0–10% polyvinyl alcohol binder fibers; and the presence of sand photosensitizers causes polymerization of said radiation curable oligomers and monomers when exposed to an ultraviolet light source resulting in curing of said mixture onto the substrate surface without substantial penetration into the substrate surface forming the gloss coated product.

24. A gloss coated product according to claim 23, wherein said homogeneous mixture comprises:

25.0–55.0 wet wt. % acrylated epoxy oligomer
9.9–20.0 wet wt. % benzophenone
6.1–14.8 wet wt. % triacrylate monomer
5.0–20.0 wet wt. % acrylated amine.

25. A gloss coated product according to claim 23, wherein said binder fibers comprise bicomponent fibers having a core made of co-polyester and a sheath made of polyester, said polyester sheath having a melting temperature which is less than the melting temperature of said chopped polyester staple fibers.

26. A gloss coated product according to claim 25, wherein said nonwoven web is held together by fusion of either said polyester sheaths or said polyvinyl alcohol binder fibers or both prior to thermal calendaring and then is thermal calendared to fuse said chopped polyester staple fibers.

27. A gloss coated product according to claim 25, wherein said nonwoven web is held together by fusion of either said polyester sheaths or said polyvinyl alcohol binder fibers or both and then is saturated on at least one side thereof with a continuous coating of pigmented binder.

28. A gloss coated product according to claim 23, wherein said gloss coated product surface is a printable surface.

29. A gloss coated product according to claim 23, wherein a second gloss coating is applied over said gloss coated product surface.

30. A gloss coated product comprising a substrate and a gloss coating applied on a surface thereof;

wherein said gloss coating is prepared from a homogeneous mixture of radiation curable oligomers and monomers and photosensitizers having a viscosity in the range of 4500 to 8000 cps; wherein said radiation curable oligomers are acrylated epoxy oligomers, said monomers are triacrylate monomers and said photosensitizer consists essentially of a combination of benzophenone and an acrylated amine in the ratio of 3/1 to 1/1;

wherein said substrate is a high-opacity cellulose-free synthetic paper comprising a nonwoven web of wet-laid synthetic fibers, said synthetic fibers including binder fibers and polymeric pulp or chopped polymeric staple fibers, said polymeric pulp or chopped polymeric staple fibers being bonded by fusing said binder fibers without substantial fusion of said polymeric pulp or chopped polymeric staple fibers at temperatures below the melting temperature of said polymeric pulp or chopped polymeric staple fibers; and the presence of said photosensitizers causes polymerization of said radiation curable oligomers and monomers when exposed to an ultraviolet light source resulting in curing of said mixture onto the substrate surface without substantial penetration into the substrate surface forming the gloss coated product.

31. A gloss coated product according to claim 30, wherein said homogeneous mixture comprises:

25.0–55.0 wet wt. % acrylated epoxy oligomer
9.9–20.0 wet wt. % benzophenone
6.1–14.8 wet wt. % triacrylate monomer
5.0–20.0 wet wt. % acrylated amine.

32. A method for making a gloss coated substrate comprising:

blending radiation curable oligomers and monomers with photosensitizers to form a gloss coating composition consisting essentially of radiation curable oligomers and monomers and photosensitizers wherein said radiation curable oligomers are acrylated epoxy oligomers, said monomers are triacrylate monomers and said photosensitizer consists essentially of a combination of benzophenone and an acrylated amine in the ratio of 3/1 to 1/1;

heating said mixture with agitation to form a homogeneous mixture having a viscosity in the range of 4500 to 8000 cps;

cooling said homogeneous mixture and applying to at least one surface of the substrate;

exposing said homogeneous mixture to an ultraviolet light source; wherein the presence of said photosensitizers causes polymerization of said radiation curable oligomers and monomers resulting in curing of said mixture onto the substrate surface without substantial penetration into the substrate surface forming the gloss coated substrates;

wherein aid substrate is non-woven, woven, synthetic paper, paper, paperboard, plastic or metal.

33. The method according to claim 32, wherein said homogeneous mixture consisting essentially of:

25.0–55.0 wet wt. % acrylated epoxy oligomer
9.9–20.0 wet wt. % benzophenone
6.1–14.8 wet wt. % triacrylate monomer
5.0–20.0 wet wt. % acrylated amine.

34. The method according to claim 33, wherein said homogeneous mixture further consists of 0.1–0.2 wet wt. % of hydroquinone mono-methyl ether (HQMME).

35. The method according to claim 32, wherein said homogeneous mixture further consists of an inhibitor for the stability of said mixture.

36. The method according to claim 35, wherein said inhibitor is selected from the group consisting of hydroquinones.

37. The method according to claim 32, wherein said homogeneous mixture further consists of slip aids, flow aids, inhibitors, silicas, optical brighteners or cure accelerators.

38. A method according to claim 32, wherein said substrate is a high-opacity cellulose-free synthetic paper comprising a nonwoven web of wet-laid thermoplastic fibers, all or most of said thermoplastic fibers being made of a predetermined polymeric material, said web having a continuous coating of pigmented binder formed on at least one surface thereof, said thermoplastic fibers made of said predetermined polymeric material being bonded by said pigmented binder without substantial thermal fusion by curing said binder at temperatures below the melting temperature of said predetermined polymeric material.

39. A method according to claim 32, wherein said substrate is a synthetic paper comprising a blow-molded container made of a predetermined polymeric material and having an outer surface and a label attached to said outer surface of said blow-molded container, the improvement wherein said label is a synthetic paper as defined in claim 61, said synthetic paper being bonded to said outer surface of said blow-molded container, at least some of said fibers making up said synthetic paper being made of said predetermined polymeric material.

40. The method according to claim 32, wherein said substrate is a nonwoven composite web for use in making cellulose-free synthetic paper, comprising a nonwoven web of 100% thermoplastic fibers entangled by a wet-lay process, said thermoplastic fibers comprising substantially unfused pulp made of a predetermined polymeric material.

41. The method according to claim 33, wherein said substrate is a nonwoven composite web for use in making cellulose-free synthetic paper, comprising a nonwoven web of 100% thermoplastic fibers entangled by a wet-lay process, said web having the following fiber composition:

50–90% chopped polyester staple fibers;
0–40% binder fibers containing a thermoplastic material having a melting temperature less than the melting temperature of said chopped polyester staple fibers; and
0–10% polyvinyl alcohol binder fibers.

42. The method according to claim 32, wherein said substrate is a high-opacity cellulose-free synthetic paper comprising a nonwoven web of wet-laid synthetic fibers, said synthetic fibers including binder fibers and polymeric pulp or chopped polymeric staple fibers, said polymeric pulp or chopped polymeric staple fibers being bonded by fusing said binder fibers without substantial fusion of said polymeric pulp or chopped polymeric staple fibers at temperatures below the melting temperature of said polymeric pulp or chopped polymeric staple fibers.

43. The method according to claim 32, wherein said gloss coated substrate surface is a printable surface.

44. The method according to claim 43, wherein a second gloss coating is applied to a printed gloss coating surface.

* * * * *

UNITED STATES PATENT AND TRADEMARK OFFICE
CERTIFICATE OF CORRECTION

PATENT NO. : 5,800,884
DATED : Sep. 1, 1998
INVENTOR(S) : D'Anna et al.

It is certified that error appears in the above-identified patent and that said Letters Patent is hereby corrected as shown below:

Claim 39, col. 24, line 13: delete "61" and insert -- 36 --.

Claim 41, col. 24, line 24: delete "33" and insert -- 32 --.

Signed and Sealed this

Twenty-ninth Day of August, 2000

*Attest:*

*Attesting Officer*

Q. TODD DICKINSON

*Director of Patents and Trademarks*